United States Patent [19]

Miller et al.

[11] Patent Number: 5,106,053
[45] Date of Patent: Apr. 21, 1992

[54] SOLENOID OPERATED HYDRAULIC CONTROL VALVE

[75] Inventors: Alan L. Miller, Ithaca, N.Y.; George H. Studtmann, Mount Prospect, Ill.; Todd L. King, Cedarburg, Wis.; Kenneth R. Gallaher, Algonquin, Ill.; Jerome J. Zawada, Glendale Heights, Ill.; William P. Umlauf, Schererville, Ind.

[73] Assignee: Borg-Warner Automotive Electronic & Mechanical Systems Corporation, Sterling Heights, Mich.

[21] Appl. No.: 612,069

[22] Filed: Nov. 9, 1990

Related U.S. Application Data

[60] Division of Ser. No. 262,152, Oct. 14, 1988, Pat. No. 4,988,967, which is a continuation-in-part of Ser. No. 237,498, Aug. 26, 1988, abandoned.

[51] Int. Cl.⁵ .................... F16K 31/06; F15B 13/044
[52] U.S. Cl. ................... 251/129.05; 251/129.07; 251/129.16; 251/282
[58] Field of Search ............ 251/129.16, 129.05, 251/129.07, 324, 282; 335/279; 137/625.65

[56] References Cited

U.S. PATENT DOCUMENTS

| | | | |
|---|---|---|---|
| 2,457,017 | 12/1948 | Walley | 335/279 X |
| 2,697,581 | 12/1954 | Ray | 251/129.16 |
| 3,368,791 | 2/1968 | Wells | 251/129.16 X |
| 3,420,256 | 1/1967 | Kobnick | |
| 3,926,405 | 12/1975 | Arnold | |
| 4,258,749 | 3/1981 | Mayer | 251/129.16 X |
| 4,571,007 | 2/1986 | Carmichael et al. | |
| 4,579,145 | 4/1986 | Leiber et al. | 251/129.16 X |

FOREIGN PATENT DOCUMENTS

| | | |
|---|---|---|
| 2531022 | 1/1977 | Fed. Rep. of Germany . |
| 1209819 | 3/1960 | France . |
| 558490 | 1/1975 | Switzerland . |
| 2115907 | 9/1983 | United Kingdom . |
| 2117872 | 10/1983 | United Kingdom . |

*Primary Examiner*—Arnold Rosenthal
*Attorney, Agent, or Firm*—Hugh A. Abrams; Greg Dziegielewski

[57] ABSTRACT

A solenoid operated hydraulic control valve system including a solenoid operated valve having a specially ported spool valve to statically balance spool forces in the opened and closed positions.

24 Claims, 7 Drawing Sheets

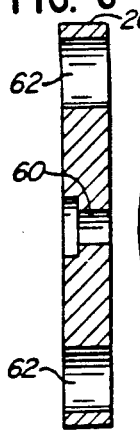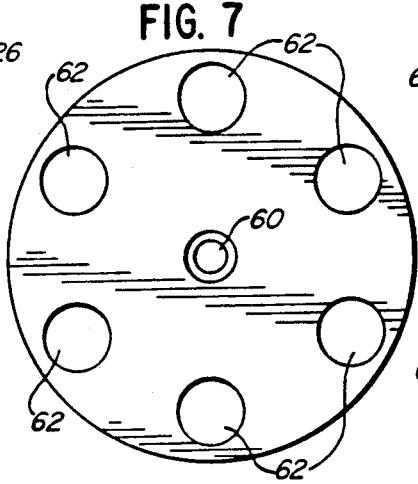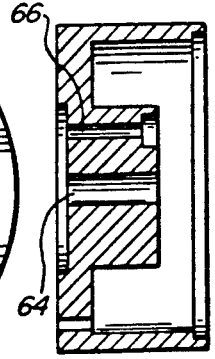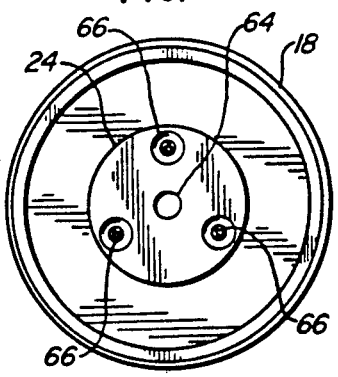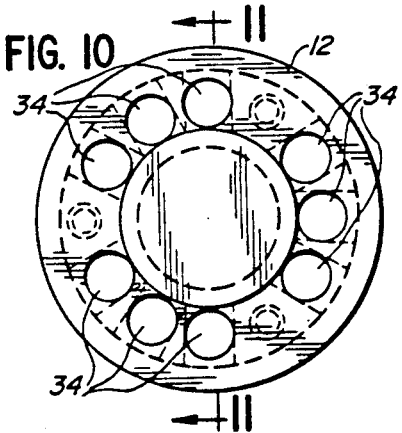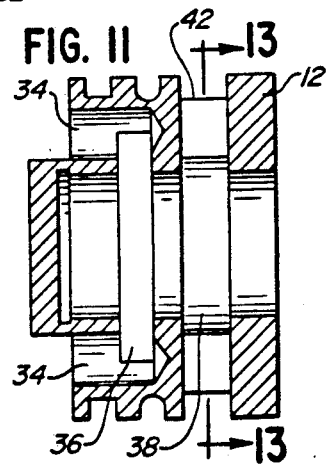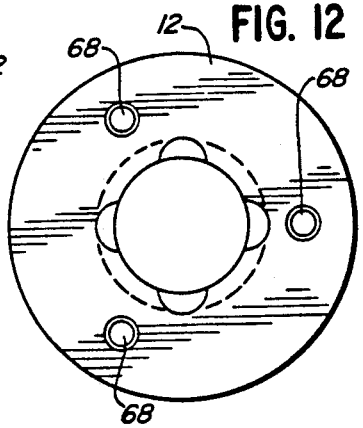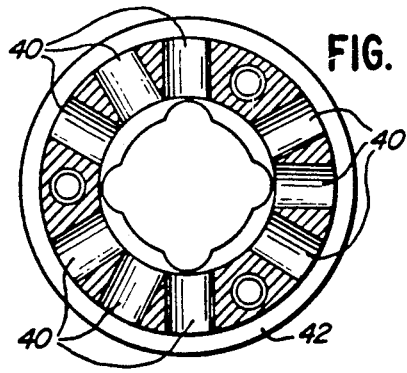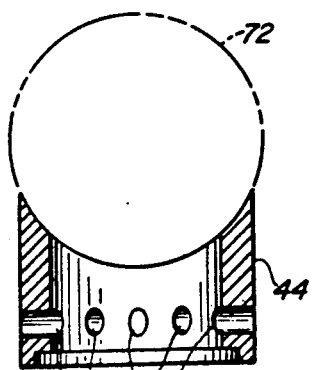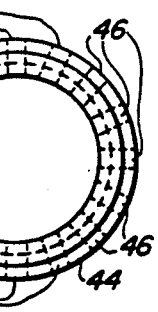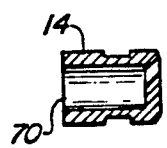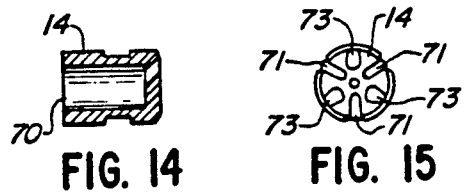

SOLENOID OPERATED HYDRAULIC CONTROL VALVE

This is a divisional application of application Ser. No. 262,152, filed Oct. 14, 1988, now U.S. Pat. No. 4,988,967 issued Jan. 29, 1991, which application is a continuation-in-part application of application Ser. No. 237,498, filed Aug. 26, 1988, which application is now abandoned.

BACKGROUND OF THE INVENTION

The present invention relates to hydraulic control valves, and more particularly to high speed, high flow solenoid operated hydraulic control valves.

An electrically controlled variable damping suspension system includes an electrically controlled hydraulic valve which acts as a variable flow restriction from one side to the other of a hydraulic damper, such as a shock absorber. According to the present invention, a solenoid operated hydraulic control valve which is suitable for operating with a pulse width modulated (PWM) control signal can be used. The flow restricting valve is designed to react fast enough to respond to the changing duty cycle of the PWM control signal at the pulse repetition frequency of the PWM control signal. For suspension control purposes, a response time on the order of 10 milliseconds is necessary to secure adequate control. The hydraulic valving system for such a suspension system must operate with flows between zero and 20 gallons per minute (GPM) and with valve pressure drops between zero and 3000 pounds per square inch (PSI).

There are significant obstacles to securing a solenoid operated hydraulic control valve which provides rapid response with small input drive signals in hydraulic systems. In the present invention, a spool valve configuration is used for regulating flow because the areas of the spool lands allow for a force balance, thereby requiring less solenoid force to move the spool.

In hydraulic systems that operate in a high pressure environment with high flow, the moving element of valves can experience great resistance to opening or closing. This is because of the pressure drop across the valve, which creates a differential force due to fluid flow on the spool in a direction to close the valve. This differential force or flow force is caused by the difference in pressure drop on the supply and delivery side of the valve lands as the spool shifts to the opened or closed position. A solenoid operator for such a flow restricting valve must develop sufficient force to overcome any flow force and return spring force during activation of the valve in order to properly shift the spool.

As part of the present invention, an electromagnetic system is provided to produce the required forces at the necessary speeds. A high power solenoid operator generally requires a large armature, having significant mass, and a large solenoid coil, having high inductance, in order to develop significant force with the limited electrical potential and current from the output of a conventional solenoid controller system. Large armature mass and high solenoid coil inductance both cause slow solenoid operator response.

Rather than increasing armature mass and solenoid inductance, according to the present invention the efficiency of a solenoid operator is improved to increase developed force. This efficiency is achieved by reducing the spacing of the non-working gap of the magnetic circuit between the armature and stator, as well as increasing the cross-sectional area of the working and nonworking gaps. In general, the length of the working gap is determined by the operator displacement, and the length of the non-working gap is limited by the necessary clearance between the armature and stator to prevent binding between them during operation. Nevertheless, in accordance with the present invention, the cross-sectional areas of these gaps are increased to diminish losses in the magnetic circuit. This is accomplished without significantly increasing the armature mass or reducing the speed of the solenoid operator response.

Another way to reduce solenoid response time is to reduce the surface tension that occurs between the armature and the stator pole piece or the armature and the cover. When surface tension is high, the armature sticks longer than it should, thereby increasing response time. To alleviate this problem, the present invention includes contouring the surfaces of the armature, stator pole piece, and cover. Not only do these contours reduce surface tension, they also have increased fluid flow in the solenoid and have reduced armature mass. These improvements, including those previously discussed, have produced a lightweight highly responsive solenoid operated hydraulic control valve.

OBJECTS OF THE INVENTION

Therefore, one object of the present invention is to reduce axial spool forces in a spool type solenoid operated hydraulic control valve, especially one which performs a metering function.

Another object of the present invention is to reduce the force necessary to operate a solenoid operated hydraulic control valve.

Yet another object of the present invention is to improve the size and efficiency of a solenoid operator for a solenoid operated hydraulic control valve.

Still another object of the invention is to improve the response time of a solenoid operated hydraulic control valve over a specified temperature range.

A further object of the invention is to provide the required valve flow over a specified temperature range with a solenoid operated hydraulic control valve.

SUMMARY OF THE INVENTION

The above described objects, as well as other advantages described herein, are achieved with a solenoid operated hydraulic control valve system which includes a solenoid operated valve having a specially ported spool valve to statically balance spool forces in the opened and closed positions. In one embodiment, the valve can meter fluid over a pressure range from zero PSI to about 3000 PSI with flow in the range of zero GPM to 20 GPM. The system also incorporates a specially designed solenoid operator which includes very small gap to cross-sectional area ratios for the working and non-working gaps between the armature and stator, without a large armature mass. The armature, cover, and stator pole piece have also been designed to reduce surface tension within the solenoid, thereby decreasing response time. Utilizing such components, in one embodiment the range of pressures and flows described above can be attained with an armature travel of about 0.035 inch between the fully opened and the fully closed positions. A feature of the present invention which augments the valve operation is the use of a PWM control signal to operate the valve in an on-off control mode.

DESCRIPTION OF THE DRAWINGS

FIGS. 6 and 7 are respective side and front views of the armature for the valve assembly of FIG. 1.

FIGS. 8 and 9 are respective side and front views of the stator for the valve assembly of FIG. 1.

FIG. 10 is a detailed end view of the valve body respectively for the valve assembly of FIG. 1.

FIG. 11 is a cross sectional view of the valve body along line 11—11 in FIG. 10.

FIG. 12 is an end view of the valve body end opposite that shown in FIG. 10.

FIG. 13 is a cross-sectional view of the valve body along line 13—13 shown in FIG. 11.

FIGS. 14 and 15 are respective side and end views of the valve spool for the valve assembly of FIG. 1.

FIGS. 16 and 17 are respective side and end views of the adaptor body for the valve assembly of FIG. 1.

DETAILED DESCRIPTION OF THE PREFERRED EMBODIMENT

Figure 1:
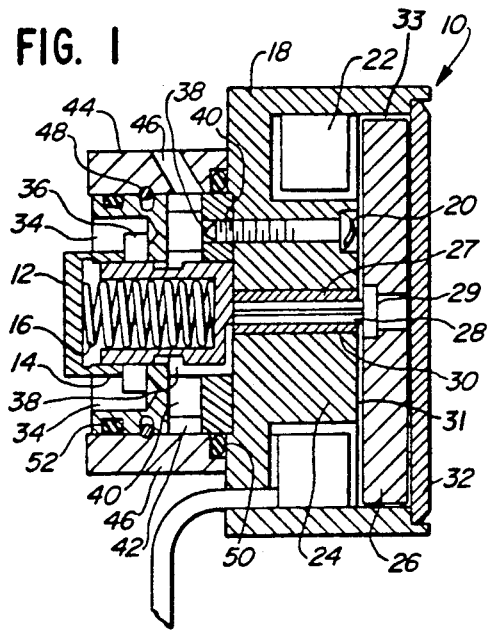
FIG. 1 is a cross sectional view of a complete solenoid operated control valve assembly according to a preferred embodiment of the invention.

The present invention includes a specially balanced and ported hydraulic spool valve coupled to a fast response, high efficiency solenoid operator which is suitable for high pressure, high flow fluid control applications such as a flow regulator for an electrically controlled variable damping suspension system. Referring to the drawings, wherein like reference characters designate like or corresponding parts throughout the views, FIG. 1 shows a complete solenoid operated control valve assembly 10 according to the present invention. The valve assembly 10 includes a valve body 12 which slidingly surrounds a valve spool 14 having a central cavity open at one end. The valve spool 14 is biased toward an open end of the valve body 12 by a compressed spring 16 which is within the valve spool 14 and retained by the closed end of the solenoid stator 18. The closed end of the valve spool 14 is vented and grooved as described below in connection with FIGS. 14 and 15. The open end of the valve body 12 is mounted to a solenoid operator stator 18 with a plurality mounting of bolts 20, for instance. The stator 18 is magnetically coupled to a solenoid coil 22 which is wound around a central pole piece section 24 of the stator 18. The valve body 12 is shown in detail in FIGS. 10 through 13.

A disc shaped armature 26 is slidingly mounted in an open end of the stator 18. The armature 26 is mounted to, and aligned in the stator 18 by, a non-magnetic plunger pin 28. A shaft 27 of the plunger pin 28 is slidably mounted in an axial bearing 30 which extends through the stator 18 along a central axis of the central pole piece section 24. The free end of the shaft 27 of the plunger pin 28 rests against the valve spool 14. Since the spring 16 biases the spool 14 toward the open end of the valve body 12, as explained above, the valve spool 14 biases the plunger pin 28, and the armature 26 against which the plunger pin 28 abuts, toward the open end of the stator 18.

A non-magnetic solenoid operator cover 32 is fastened to the open end of the stator 18, limiting travel of the armature 26 at an outward most position in the stator 18 to prevent the armature 26 and the plunger pin 28 from escaping the stator 18 under the force of the spring 16 a "working" gap 31 is formed between the adjacent surfaces of the pole piece section 24 and the armature 26 when the valve in the open position. A radial "non-working" gap 33 for the magnetic return circuit is positioned between the adjacent surfaces of the open end of the stator 18 and the radial outer surface of the armature 26 when the valve is in the closed position as illustrated in FIG. 1.

The terms "working" and "non-working" relate to the positioning of the gaps between the armature 26 and the stator 18. The working gap is the air gap between the surface of the stator pole piece 24 and the adjacent surface of the armature 26, in this case the gap 31.

The non-working gap is the air gap for the magnetic return circuit between the armature 26 and the stator 18, in this case the radial gap 33 between the radial outer surface of the armature 26 and the adjacent inner surface of the open end of the stator 18. The use of the terms "working" and "non-working" are thus in keeping with their ordinary usage as known in the art. The plunger pin 28 has a head 29 shaped to fit closely in a corresponding recess 25 in the armature 26. The head 29 may be secured in the recess 25 with a press fit, for instance. The cover 32 forms a fluid seal for the valve and for the entire solenoid operated hydraulic valve system.

Referring to FIGS. 1 and 10 through 13, the valve body 12 includes an input port, which may include a plurality of radially disposed cylindrical axial valve inlets 34. The valve inlets 34 are channeled to the valve spool 14 via an annular pressure channel 36. The valve body 12 also includes an outlet port, which may include a delivery channel 38 ported with a plurality of radial outlets 40. The outlets 40 are discharged into an annular discharge channel 42, as shown best in FIG. 13. The discharge channel 42 may be ported through an adapter body 44 with a plurality of radial body outlets 46 as shown in FIGS. 1, 16, 17 and 22. The adapter body 44 is fitted over the valve body 12 and retained with an inner retaining ring 48, and sealed with an inner annular seal 50 and an outer annular seal 52 to prevent external valve leakage. As shown best in FIG. 22, the valve system is then secured, as by welding or the like, in an aperture of a hydraulic damper which incorporates the remainder of the hydraulic system.

Figure 2:
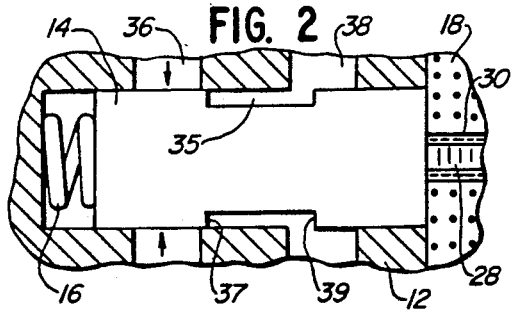
FIG. 2 is a side view of the valve spool relative to the valve body shown in the closed position for the valve assembly of FIG. 1.
Figure 3:
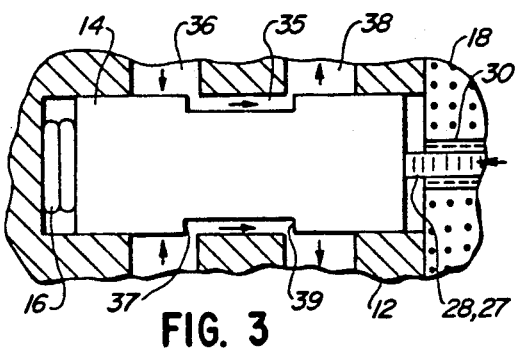
FIG. 3 is a side view of the valve spool relative to the valve body shown in the open position for the valve assembly of FIG. 1.

The fluid control operation of the valve assembly 10 is more clearly shown in FIGS. 2 and 3, which illustrate the position of the valve plunger 14 relative to the pressure channel 36 and delivery channel 38 of the valve body 12 for the closed and opened positions of the valve assembly 10, respectively. In FIG. 2, the valve spool 14 blocks fluid flow through the valve body 12 because an annular recess 35 of the valve spool is displaced by the spring 16 to the right of the pressure channel 36, so that a left side land 37 of the valve spool 14 substantially closes the pressure channel 36. The design of the particular embodiment permits a leakage flow of less than 1 GPM at a differential pressure of about 3000 PSI. As shown in FIG. 3, the valve spool 14 allows fluid flow through the valve body 12 when the plunger pin 28 overcomes the bias force of the spring 16 to move the valve spool 14 to the left and let the recess 35 of the valve spool 14 provide a flow path between the pressure channel 36 and the delivery channel 38. The width of the recess 35 in the valve spool 14 and its displacement are selected to create equal area restrictions to flow for both the pressure channel 36 and the delivery channel 38 when the valve spool 14 is fully displaced to the opened position, as shown in FIG. 3. These restrictions are substantially greater than the flow restriction offered by the valve spool recess 35.

Figure 18:
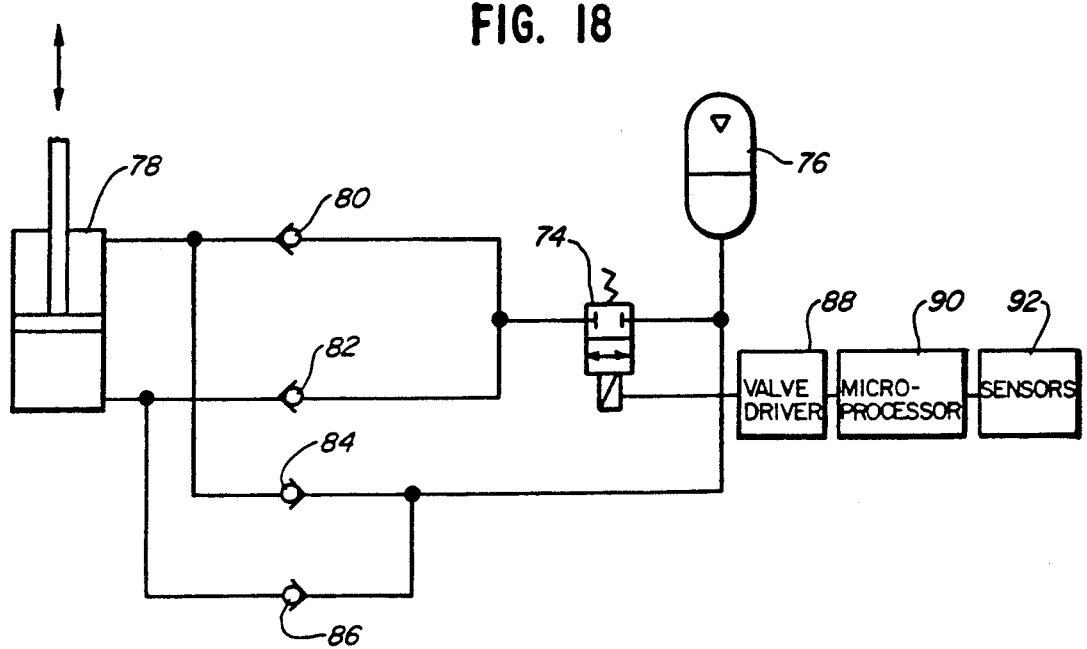
FIG. 18 is a schematic diagram of a semi-active hydraulic damping system suitable for use with the valve assembly of FIG. 1.
Figure 19:
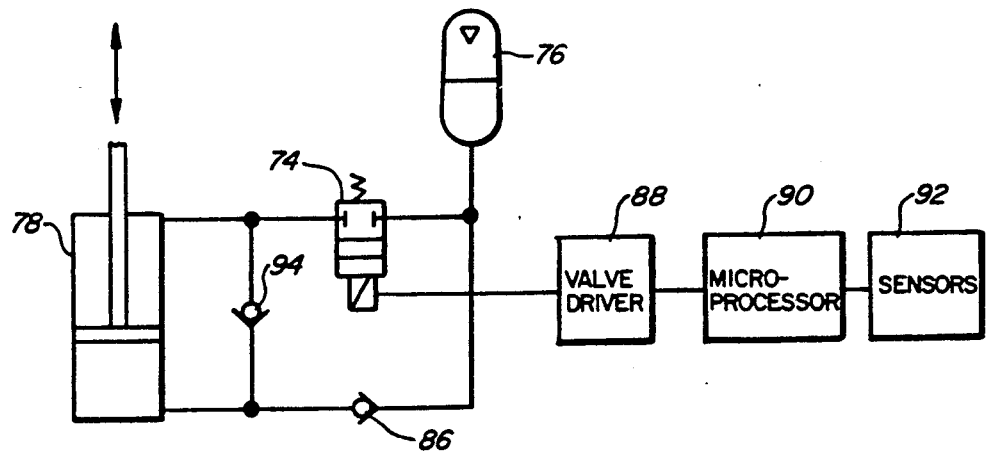
FIG. 19 is a schematic diagram of a simplified semi-active hydraulic damping system suitable for use with a single ended damping cylinder and the valve assembly of FIG. 1.
Figure 22:
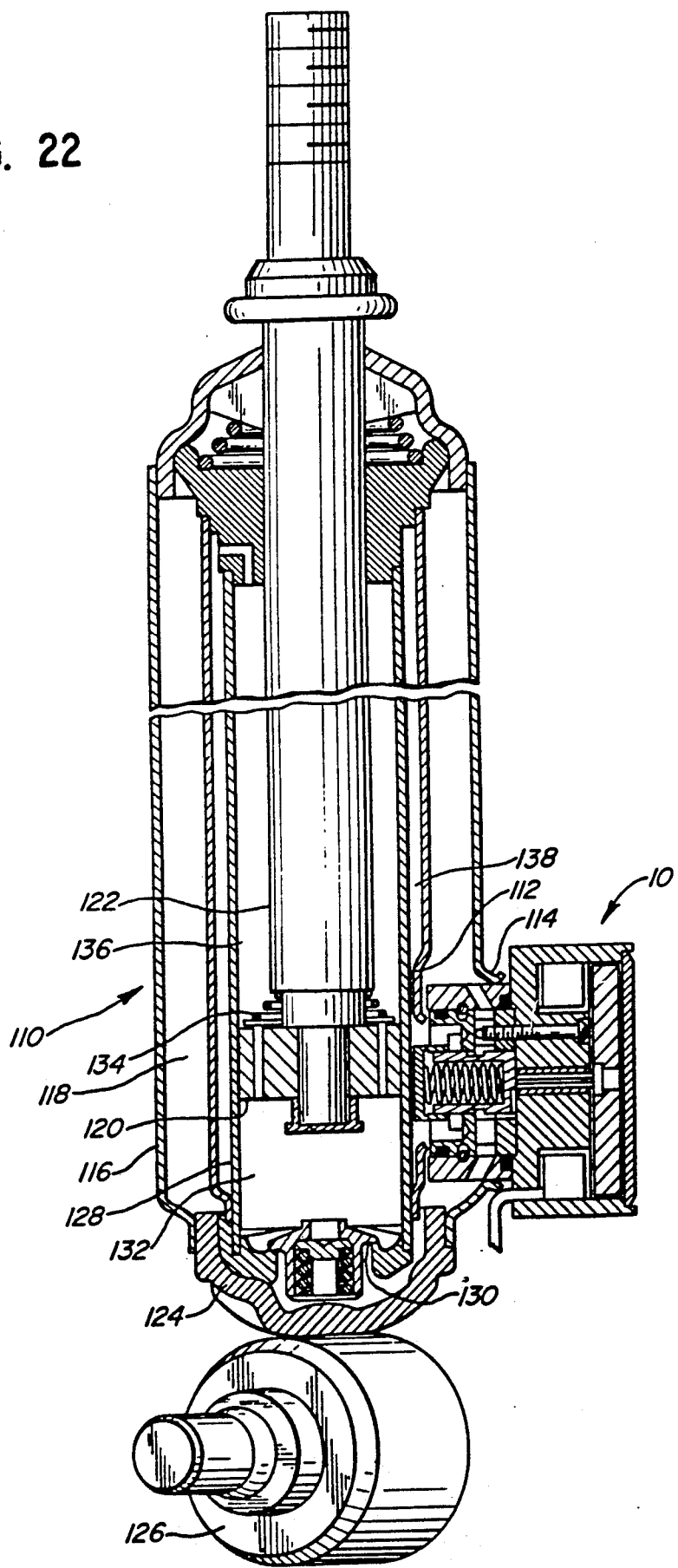
FIG. 22 is a typical installation of the valve assembly of FIG. 1 on a hydraulic shock absorber adapted for semi-active damping.

Because the entire system of FIG. 22 is pressurized, and the area restrictions from the pressure channel 36 and the delivery channel 38 are equal when the valve spool 14 is in the open position, the pressure drop on each end of the recess 35 of the valve spool 14 is also the same. That is, the pressure drop from the pressure channel 36 against the radial face of the left land 37 of the valve spool 14 develops a force to bias the spool 14 to the right, or the closed position, and the pressure drop between the recess 35 of the valve spool 14 and the delivery channel 38 against a right side land 39 of the valve spool 14 develops an equal and opposite force to bias the spool 14 to the left, or opened position. Thus, the valve spool is statically balanced hydraulically when the plunger pin 28 applies sufficient force to displace the valve spool 14 to the fully opened position. The hydraulic system and the associated control system described with respect to FIGS. 18 and 19 are configured to operate in an on-off mode between the fully opened and the fully closed positions.

Although the valve spool 14 is statically balanced hydraulically in the closed and opened positions, flow through the valve body 12 for intermediate positions of the valve spool 14 causes a flow force which biases the valve spool 14 toward the closed position.

Figure 4:
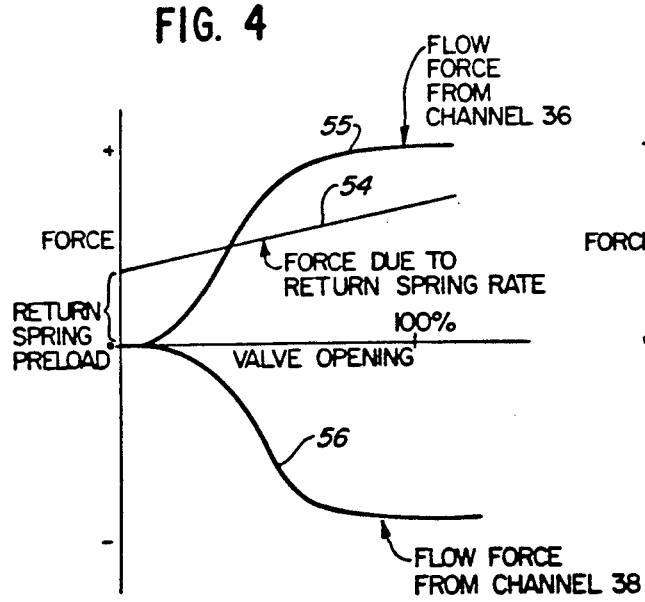
FIG. 4 is a graphical representation of static forces developed on the valve assembly of FIG. 1 as a function of position.
Figure 5:
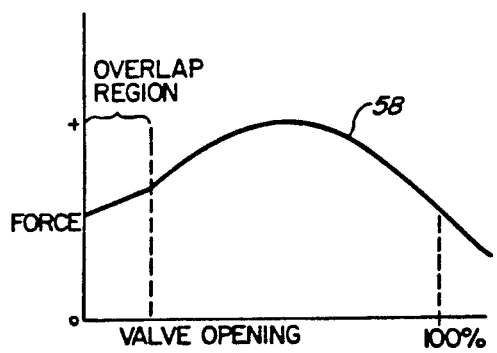
FIG. 5 is a graphical representation of the total static force on the valve assembly of FIG. 1 as a function of position.

The static axial forces developed on the valve spool 14 are graphically represented in FIG. 4. A line 54 represents the return spring force, both preload and rate, biasing the valve spool 14 toward the closed position. A line 55 represents the flow force due to the pressure gradient which exists at the spool lands 37,39 from the pressure channel 36, biasing the valve spool 14 toward the closed position. A line 56 represents the flow force due to the pressure gradient which exists at the spool lands 37,39 from the delivery channel 38, biasing the valve spool toward the open position. FIG. 5 is a graphical representation of the total static force on the valve spool 14 as a function of position, with a line 58 representing the total net resultant static force biasing the valve spool 14 as it shifts in position from closed to 100 percent open. Note that the valve spool 14 has no resultant axial bias force in the fully open and fully closed positions with the exception of the return spring force. Note that during the initial segment of the spool strike, the only force present is that of the return spring. This is due to the overlap designed into the valve to minimize valve leakage in the off or closed position as shown in FIG. 2. In the overlap region, no flow exists in the channel 35, except for insignificant valve leakage flow. Once the spool travels past this overlap, then flow is allowed through the channel 35 as shown in FIG. 3. The current applied to the solenoid coil 22 is regulated in such a manner to overcome the valve and spring forces at all spool position, to move the valve spool to the on or open position when energized.

As explained above, the valve spool 14 is dislodged from its normally closed position by the plunger pin 28, and the plunger pin 28 is moved by the armature 26 to which it is fastened. The armature 26 can rely upon the support of the plunger pin 28 in the axial bearing 30 for alignment within the stator 18. Because of the small travel of the armature 26, slight cocking of the armature 26 can be tolerated. This alignment feature permits the use of a thin and low mass disc shaped structure for the armature 26, which structure would otherwise be unsuitable because of its tendency to become axially misaligned or wedged during armature travel. Detailed side and front views of the armature 26 are shown in FIGS. 6 and 7 respectively. They illustrate the large diameter, thin profile construction of the armature 26. The armature 26 includes a central hole 60 for the plunger pin 28, and six axial holes 62, which serve to permit fluidic flow between each side of the armature 26 as it moves, to improve its response rate, as well as to lower its mass. The entire system is sealed with a fluid environment. When the armature 26 moves, fluid must be displaced from one side of the armature 26 to the other. If the fluid flow is restricted, a force will be produced on the armature 26 which will tend to degrade the response time. The six axial holes 62, allow for flow area for the fluid to flow with less restriction and thus help to improve the response time. The number and size of the holes were determined to be able to accommodate the increase in fluid viscosity for cold temperature operation. This allows for fast response during cold temperature conditions.

In a conventional solenoid with the armature diameter being equal to the central pole piece diameter, axial holes would be placed in the armature or axial notches would be placed in the outer periphery of the armature to allow for fluid flow area. These holes and notches would tend to decrease the magnetic efficiency and thus the force produced by the solenoid. In this design the large diameter of the armature 26 allows the six axial holes 62 to be positioned between the working gap area and the nonworking gap area where they do not substantially interfere with the magnetic efficiency of the solenoid valve 10.

The large diameter of the armature 26 provides a very large surface area around the circumference of the armature 26 even though the armature 26 is relatively thin. This large circumferential area also allows a moderate non-working size gap without a noticeable compromise of efficiency, to allow additional fluidic flow from one side of the armature 26 to the other as it moves within the stator 18. The large diameter of the armature 26 also allows a large cross-sectional area for the working gap between the armature 26 and the central pole piece section 24 of the stator 18, lowering the effective reluctance of the working gap, thus increasing overall efficiency still further. This allows for a smaller number of turns in the solenoid coil 22 to produce the desired magnetic field and resultant force. The smaller number of turns results in a smaller coil length and smaller overall solenoid length.

Detailed side and front views of the stator 18 are shown in FIGS. 8 and 9, respectively. The central pole piece section 24 includes a central axial hole 64 for the axial bearing 30 and three axial mounting holes 66 for the mounting bolts 20.

A detailed end view of the valve body 12 is shown in FIG. 10. FIG. 11 is a cross sectional view of the valve body 12 along line 11—11 in FIG. 10. FIG. 12 is a view of the end of the valve body 12 opposite that shown in FIG. 10. FIG. 13 is a cross-sectional view of the valve body 12 along line 13—13 shown in FIG. 11. In particular, FIG. 12 shows three valve body mounting holes 68 for the mounting bolts 20. FIG. 10 shows nine of the axial inlet ports 34 circumferentially arranged around the end of the valve body 12 and communicating with the inlet channel 36. FIG. 13 shows nine of the radial outlet ports 40 extending between the delivery channel 38 and the discharge channel 42.

Detailed side and end views of the valve spool 14 are shown in FIGS. 14 and 15 respectively. The valve spool 14 includes a spring retaining chamber 70 for retaining the spring 16 and includes a plurality of seats 71 and apertures 73 to permit the free flow of fluid through the spring chamber 70.

Detailed side and end views of the adapter body 44 are shown in FIGS. 16 and 17, respectively. In particular, FIG. 16 shows how the adapter body 44 can be mounted to the contoured surface of a hydraulic shock absorber indicating by the broken line 72. FIG. 17 shows seven of the sixteen radial body outlets 46.

The present invention is uniquely suited to a semi-active hydraulic damping system, as shown schematically in FIG. 18. A solenoid operated control valve according to the present invention, such as the valve assembly 10 described above in connection with FIG. 1, is shown as a normally closed, solenoid operated two way valve 74. The valve 74 is discharged into a fluidic reservoir, such as a pressurized hydraulic accumulator 76. The cylinder 78 has a first end feeding the valve 74 through a check valve 80, and a second end feeding the valve 74 through a check valve 82. The accumulator 76 feeds the first end of the cylinder 78 through a check valve 84. The accumulator also feeds the second end of the cylinder 78 through a check valve 86.

The operation of the hydraulic circuit is such that when the valve 74 is energized to the opened position, compression of the cylinder 78 forces fluid out of the second end of the cylinder 78 through the check valve 82 and the valve 74 into the accumulator 76. Fluid is blocked from bypassing the valve 74 by the check valve 86. Fluid is permitted to flow into the first end of the cylinder 78 from the accumulator 76 through the check valve 84. Fluid cannot flow from the second end to the first end of the cylinder 78 because such flow is blocked by the check valve 80. By energizing the valve 74 only periodically, the average flow through the valve 74 is reduced, thereby increasing damping of the cylinder 78. If a PWM control signal operates the valve 74, the duty cycle of the PWM signal will control the damping of the cylinder 78. This PWM signal is supplied by a valve driver 88, which operates the valve 74 to provide the desired operational characteristics. For instance, a proportional valve characteristic having a proportional relationship between valve flow and an input variable may be achieved by proportionally varying the PWM control signal duty cycle from the driver 88. One driver system which is uniquely suitable for use as the driver 88 is shown, described and claimed in a patent application, filed of even date herewith, entitled "Driver for High Speed Actuator," in the names of George H. Studtmann, Stanley B. Quinn and Todd L. King. The duty cycle is controlled by a signal, such as a microprocessor 90, which feeds the driver 88. The microprocessor 90 accepts input data, such as from at least one input sensor 92, and compares it to programmed information, such as set points and other input variables, to control the driver 88 in response to the input data and programmed information. Tension on the cylinder 78 forces fluid out of the first end of the cylinder 78 through the check valve 80 and the valve 74 into the accumulator 76. Fluid is blocked from bypassing the valve 74 by the check valve 84. Fluid is permitted to flow into the second end of the cylinder 78 from the accumulator 76 through the check valve 86. Fluid cannot flow from the first end to the second end of the cylinder 78 because such flow is blocked by the check valve 82. By energizing the valve 74 with a PWM control signal as described above, variable damping with the cylinder 78 under tension is likewise achieved.

If the cylinder 78 is a single ended type with its rod and piston area substantially less than its non rod end piston area, a simplified hydraulic system may be used as shown in FIG. 19. It is similar to the system shown in FIG. 18, but the check valves 80, 82 and 84 are replaced by a single check valve 94. The check valve 94 is connected across the cylinder 78 to allow flow both from the second end of the cylinder 78 to the first end of the cylinder 78 and through the valve 74.

Tension on the cylinder 78 forces fluid out of the first, or rod, end of the cylinder 78. This fluid must flow through the valve 74 into the accumulator 76, because the check valve 94 blocks flow to the second side of the cylinder 78. When the valve 74 is modulated by a PWM control signal from the valve drive 88, as explained above in connection with the system shown in FIG. 18, variable damping results.

Compression of the cylinder 78 forces fluid out of the second ends of the cylinder 78 through the check valve 94 into both the first end of the cylinder 78 and through the valve 74 into the accumulator 76. The check valve 86 blocks flow from bypassing the valve 74. Because the rod end of a cylinder displaces less volume for a given stroke than the non rod end, much of the fluid forced out of the second end of the cylinder 78 during compression must flow through the valve 74 rather than into the first end of the cylinder 78. Therefore, modulating the valve 74 with a PWM control signal from the valve driver 88 during compression of the cylinder 78 will cause variable damping.

Figure 20:
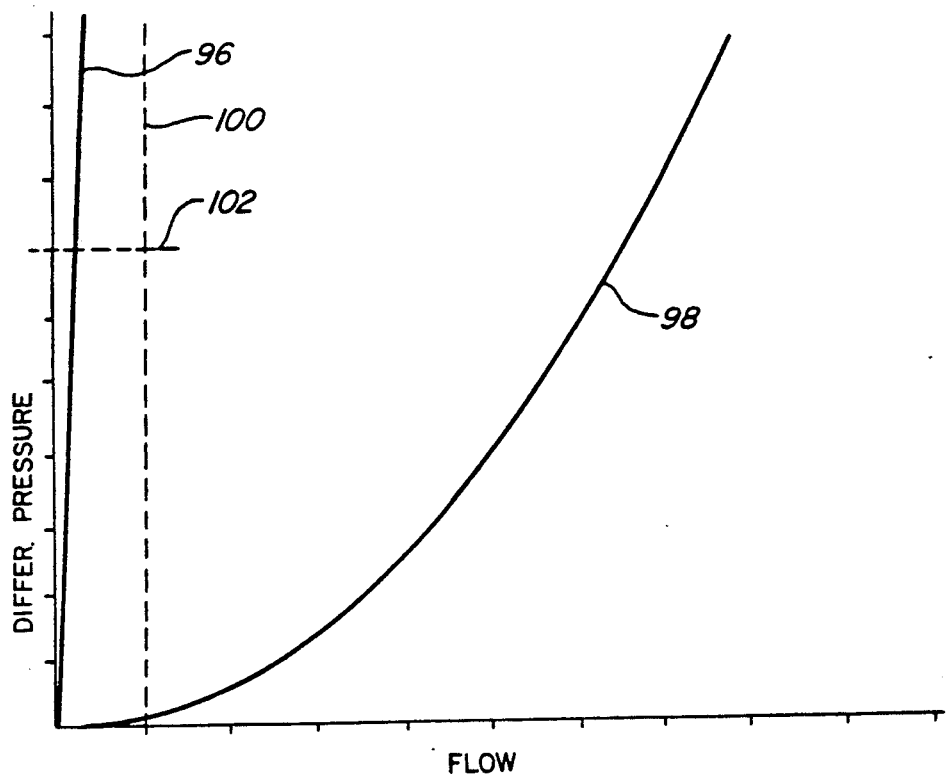
FIG. 20 is a graphical representation of differential pressure across the valve assembly of FIG. 1 as a function of valve flow.

FIG. 20 is a graphical representation of differential pressure across a solenoid operated control valve according to the present invention, such as the valve assembly 10 described above in connection with FIG. 1, as a function of valve flow. A line 96 represents valve differential pressure as a function of flow in the closed position. The flow shown in the closed position is attributable to unavoidable valve leakage. A line 98 represents valve differential pressure as a function of flow in the opened position. When the valve is periodically cycled to maintain an average flow indicated by a dashed line 100, an average differential pressure represented by a dashed line 102 results. Likewise, any other average differential pressure may be achieved by changing the average flow of the valve, which in turn may be controlled by varying the duty cycle of the valve when it cycles on and off at a substantially constant rate.

Figure 21:
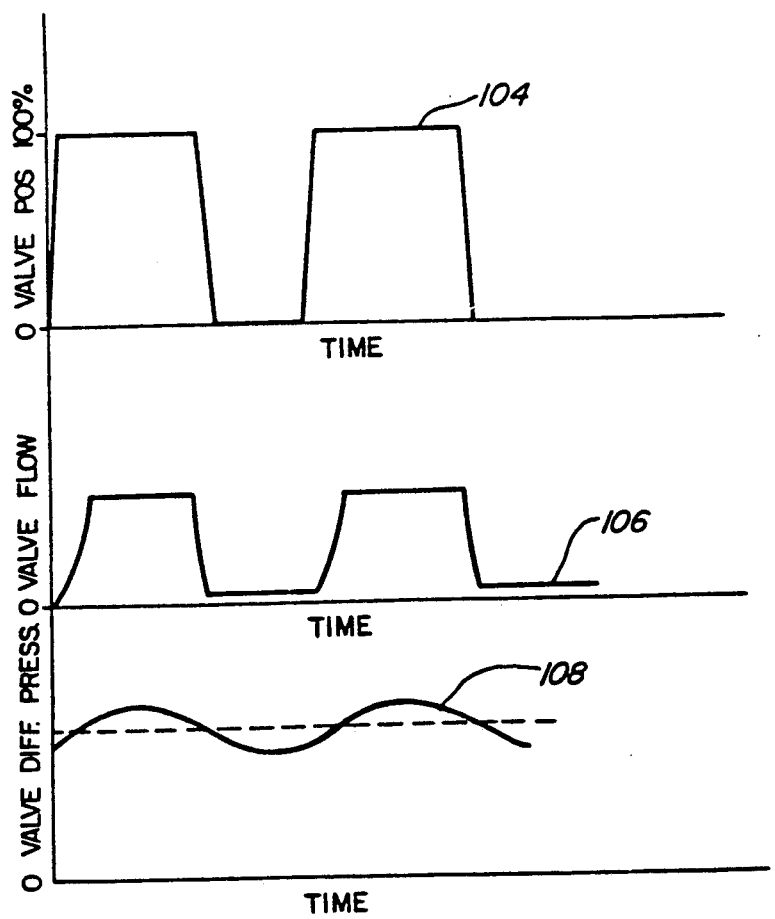
FIG. 21 is a graphical representation of valve position, valve flow, and valve differential pressure, as a function of time for the valve assembly of FIG. 1.

FIG. 21 is a graphical representation of valve position, valve flow, and valve differential pressure as a function of time for a solenoid operated control valve according to the present invention, such as the valve assembly 10 described above in connection with FIG. 1. A line 104 represents valve position as a function of time. A line 106 represents corresponding valve flow as a function of time for the valve positioning represented by the line 104. A line 108 represents corresponding valve differential pressure as a function of time for the valve flow represented by the line 106. It is evident from FIG. 21 that a relatively constant average pressure may be achieved by cycling the valve as shown by the line 104.

FIG. 22 illustrates a preferred embodiment of the system for damper or shock absorber control for the solenoid operated control valve assembly 10, as described above in connection with FIGS. 1 through 21, on one end of a suitable hydraulic shock absorber assembly 110. The end of the valve assembly 10 mounts in, and is sealed by, an inner flange section 112 and an outer flange section 114. The inner flange section 112 isolates valve input port flow from valve output port flow, and the outer flange section 114 prevents hydraulic fluid from leaking out of the shock absorber assembly 110 around the valve assembly 10. An outer casing 116 defines a reservoir 118 corresponding generally to the accumulator 76 shown in FIGS. 18 and 19. A piston 120 within the shock absorber 110 can operate in either tension or compression, depending on load conditions.

In an automotive application, a piston rod 122 of the shock absorber 110 would generally be operatively connected to the frame of the vehicle while a reservoir housing bottom bell 124 would be operatively connected to the wheel through an axle casing and a pivoted connection 126. The rod 122 is of substantial diameter relative to a cylinder wall 128, thus substantially increasing the pressurization of the system in the compression mode as the piston 120 moves toward the end of the cylinder opposite the rod 122 and the rod 122 fills increasing amounts of the cylinder.

The bottom bell 124 has a check valve 130 which permits flow of fluid from the reservoir 118 into a cylinder cavity 132 below the piston 120. The check valve 130 is oriented to permit flow into the cavity 132 as the piston 120 moves up under tension in rod 122. There is also a check valve 134 in the piston 120 which permits flow from the cavity 132 into an upper cylinder cavity 136 when the damper rod 122 is in compression or the pressure in the upper cavity 136 is less than the pressure in the lower cavity 132.

The system functions as follows: The reservoir 118 is not completely filled with fluid in the static range of loads. When the damper is put under increased compression, fluid is forced from the upper cylinder cavity 136, and through a communicating passageway 138 to the inlet ports 34 of the valve 10. With the valve closed fluid will pass there through at a slow rate, less than one gallon per minute at 3000 psi differential pressure. When the shock absorber 110 is in compression, pressure is built up in the lower cylinder cavity 132. Flow is then dumped across the check valve 134 into the upper cylinder cavity 136. As the piston rod 122 enters cylinder 128, the available oil volume of the upper cylinder cavity 136 is decreased by the volume of the piston rod 122. The upper cylinder cavity 136 can not accept all of the flow from the lower cylinder cavity 128. This builds up a pressure in the lower cylinder cavity 132 which is ported to the passageway 138. The fluid then may enter the valve 10 through the ports 34. With the valve closed, a significantly high shock absorber force can be realized due to the high pressure in the cylinder cavities 132, 136 and the differential area of the piston.

With the valve open, the pressure in the cylinder cavities 132, 136 is relieved through the valve 10 by the pressure channel 36. This flow is then dumped in the accumulator chamber 118 via the groove 42 through the body ports 46. Substantially low shock absorber force is then obtained. By modulating the flow through the valve 10, the shock absorber forces can be controlled.

Shock absorber force can be modulated in a somewhat analogous fashion when the shock absorber is in extension. In this case, pressure is built up in the cavity 136. The check valve 134 forces fluid to exit the cavity 136 and enter the passageway 138. The flow through valve 10 follows the same sequence as the compression cycle with flow being dumped into the accumulator chamber 118. When the piston 120 moves in extension, pressure in the cavity 132 will drop below the accumulator chamber 118, and fluid will flow into the cavity 132 through the check valve 130.

With the valve 10 closed, pressure is allowed to build up in the cavity 136. A significantly high shock absorber force can be realized due to the high pressure in the cylinder 136. With the valve 10 open, the pressure is dumped into the accumulator chamber 118 resulting in substantially low shock absorber forces. Again, by modulating the flow through the valve 10, the shock absorber forces can be controlled.

The system is readjusted for changes in the dynamics by pulsing the coil 22 at a rate such as 20 Hz with an appropriate duty cycle. For example, if the damper experiences increased compression, the valve will be pulsed to the full open position permitting fluid to pass at a metered rate up to about 20 GPM to adjust for new conditions. The fluid passes from the inlet ports 34 and the pressure channel 36 to the delivery channel 38 and the system body outlets 46 into the reservoir 120.

In a somewhat analogous fashion, upon reducing the compression or applying tension to the rod 122, the valve 10 can be pulsed to permit a flow of up to 20 GPM from the upper cavity 136 through the valve 10 and into the reservoir 118. However, in the mode of increasing tension the check valve 130 permits the fluid to flow into the lower cylinder cavity 132, while the check valve 134 in the piston 120 precludes flow from the upper cavity 136 to the lower cavity 132.

Figure 23:
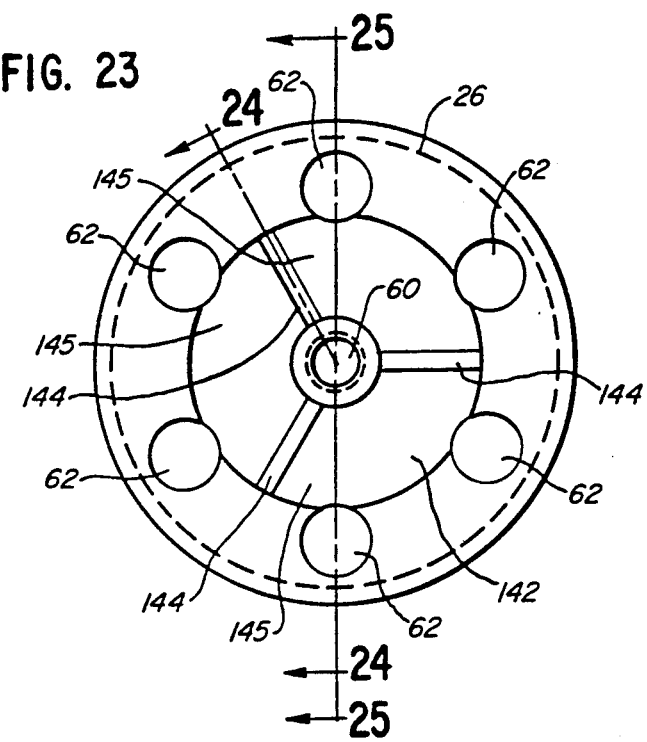
FIG. 23 is a view showing the inner surface of the armature.

One particular preferred embodiment of the armature 26 is shown in FIG. 23. This view illustrates the inner surface 142 of the armature 26 to show how the inner surface 142 can be changed to reduce armature sticking. The armature 26 still includes a central hole 60 for the plunger pin 28 and six axial holes 62, which serve to permit fluidic flow between each side of the armature 26 as it moves to improve its response rate, as well as to lower its mass. This embodiment contains the addition of a tri-radial pattern 144, formed on the inner surface 142 of the armature 26. This change to the inner surface 142 of armature 26 will not only reduce armature sticking, but will also increase fluidic flow and decrease armature mass.

Figure 24:
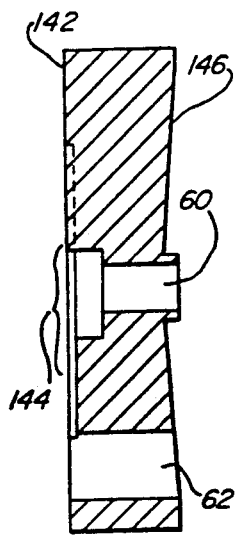
FIG. 24 is a first cross-sectional view of the armature taken generally along line 24—24 of FIG. 23 showing the surface contours of the inner and outer surfaces of the armature.

FIG. 24 clearly illustrates how the inner surface 142 of the armature 26 is formed. Looking along line 24—24 of FIG. 23, it can be seen that the tri-radial pattern 144 comprises substantially triangular depressions 145 cut down into the inner surface 142 around the radial spokes of the tri-radial pattern 144. These triangular depressions 145 touch the edges of axial holes 62 and allow for increased fluidic flow into those holes. The triangular depressions 145 that have been cut away also reduce armature mass, thereby decreasing solenoid response time, but the main reason for the addition of tri-radial pattern 144 is to reduce surface tension. Because the radial spokes of the tri-radial pattern 144 between the depressions 145 have surfaces raised above the depressions 145, a large part of the surface area of the inner surface 142 that would otherwise come into contact with the stator pole piece section 24 has been reduced, thereby decreasing response time by reducing surface tension.

Although it is preferred to locate the tri-radial pattern 144 on the inner surface 142 of the armature 26, the same tri-radial pattern 144 could also be formed on the surface of the stator pole piece section 24. Locating the tri-radial pattern 144 on the surface of the stator pole piece section 24 will also reduce armature sticking, because it is this surface that comes in contact with the armature.

Figure 25:
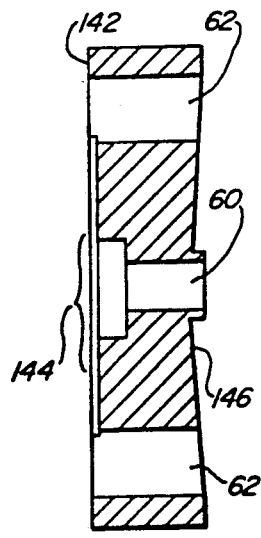
FIG. 25 is a second cross-sectional view of the armature taken generally along line 25—25 of FIG. 23 showing the surface contours of the inner and outer surfaces of the armature.

FIG. 25 is a cross-sectional view of the armature 26 cut along section 25—25 of FIG. 3. This view illustrates how the triangular depressions 145 that have been cut away from the inner surface 142 extend to the edges of the axial holes 62.

Figure 26:
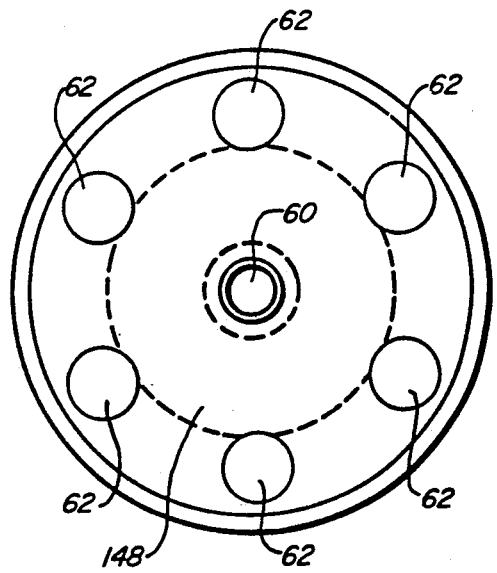
FIG. 26 is a view showing the outer surface of the armature.
Figure 27:
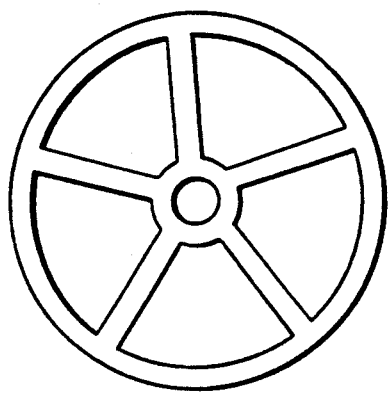
FIG. 27 is a first type of pattern that can be formed on the inner surface of the armature as shown in FIG. 23.
Figure 28:
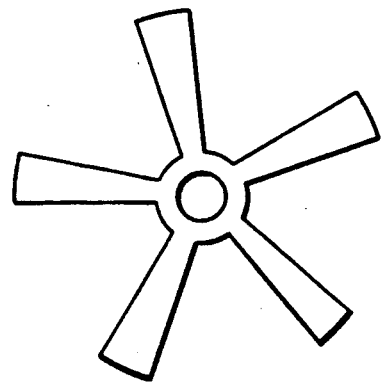
FIG. 28 is a second type of pattern that can be formed on the inner surface of the armature as shown in FIG. 23.
Figure 29:
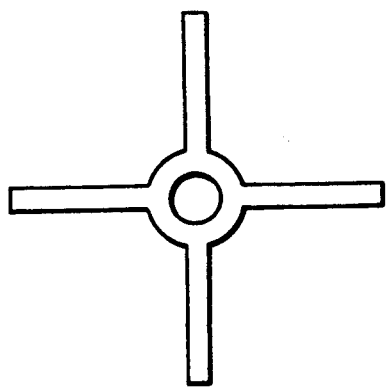
FIG. 29 is a third type of pattern that can be formed on the inner surface of the armature as shown in FIG. 23.
Figure 30:
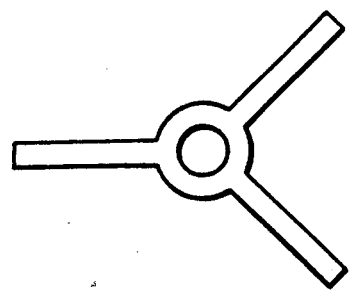
FIG. 30 is a fourth type of pattern that can be formed on the inner surface of the armature as shown in FIG. 23.

FIG. 26 is a view showing the outer surface 148 of the armature 26. The outer surface 148 shows the preferred embodiment necessary to reduce armature sticking. As may be most clearly seen in FIG. 25, this embodiment has a surface contour 146 in the outer surface 148 that recedes towards the axis of the armature 26.

Although the surface contour 146 shown has a constant slope as it recedes towards the axis, the surface contour 146 could have a varying slope or it could also be concave. In any event, the surface contour 146 will reduce armature mass and reduce armature sticking, thereby decreasing solenoid response time.

Because surface tension can develop between the outer surface 148 of the armature 26 and the inner surface of the cover 32, the surface contour 146 of the armature 26 could instead be made on the inner surface of the cover 32. To effectively reduce surface tension by this method, the inner surface of the cover 32 would have a surface contour that recedes towards the axis of the cover 32. The surface contour could have a constant or varying slope as it recedes towards the axis of the cover 32.

FIG. 27 through 30 illustrate various alternate patterns that can be used to reduce armature sticking. These patterns can be formed into the inner surface of the armature 26 or into the face of the stator pole piece.

Another way to reduce surface tension is to make a thin disc that occupies the armature/stator pole piece interface. The disc should have a constant thickness and may be shaped according to a specific pattern such as those shown in FIGS. 27 through 30.

Therefore, there has been described herein a solenoid operated hydraulic control valve which combines a statically balanced valve spool configuration with a high speed solenoid operator. It will be understood that various changes in the details, arrangements and configurations of the parts and assemblies which have been described and illustrated in order to explain the nature of the invention may be made by those skilled in the art within the principle and scope of the invention as expressed in the appended claims.

What is claimed is:

1. A spool valve comprising:
   a valve spool including a central recess region of predetermined length and substantially constant cross section along said recess region length;
   a valve body slidably fitted over said valve spool, including a supply port, a discharge port separated from said supply port by a port separation length less than said recess region length, said supply port and said discharge port having substantially identical areas along said valve body;
   means for biasing said valve spool to a normally closed position with said valve spool recess region positioned beyond said supply port toward said discharge port to block fluid flow through said valve recess region from said supply port; and
   means for displacing said valve spool to an open position with said valve spool recess region displaced midway between said supply port and said discharge port to allow flow through said valve recess region from said supply port to said discharge port without flow induced valve spool force imbalance.

2. The spool valve recited in claim 1, wherein said means for biasing includes a compression type spring penetrating said valve body from a spring end of said valve body, said spring being axially aligned with said valve spool.

3. The spool valve recited in claim 2, wherein said means for displacing includes a plunger pin penetrating said valve body from a plunger pin end of said valve body opposite said valve body spring end.

4. The spool valve recited in claim 3, wherein said supply port includes an annular supply channel in said valve body surrounding said valve spool, and said discharge port includes an annular discharge channel in said valve body surrounding said valve spool, said supply channel and said discharge channel having substantially equal lengths along said valve body.

5. The spool recited in claim 4, wherein said valve body comprises a cylindrical cavity located in a spool valve housing.

6. The spool valve recited in claim 5, further comprising a valve body plunger end wall for retaining said valve spool in said normally closed position.

7. A spool valve comprising: a valve spool including a central recess region of predetermined length and substantially constant cross section along said region length;
 a valve body having a cylindrical cavity in a spool valve housing and slidably fitted over said valve spool, including a supply port, a discharge port separated from said recess region length, said supply port and said discharge port having substantially identical areas along said valve body;
 means for biasing said valve spool to a normally closed position with said valve spool recess region positioned beyond said supply port toward said discharge port to block fluid flow through said valve recess region from said supply port, wherein said means for biasing includes a compression type spring penetrating said valve body from a spring end of said valve body, said spring being axially aligned with said valve spool;
 means for displacing said valve spool to an open position with said valve spool recess region displaced midway between said supply port and said discharge port to allow flow through said valve recess region from said supply port to said discharge port without flow induced valve spool force imbalance, wherein said means for displacing includes a plunger pin penetrating said valve body from a plunger pin end of said valve body opposite said valve body spring end;
 a valve body plunger end wall for retaining said valve spool in said normally closed position;
 wherein said supply port includes an annular supply channel in said valve body surrounding said valve spool, and said discharge port includes an annular discharge channel in said valve body surrounding said valve spool, said supply channel and said discharge channel having substantially equal lengths along said valve body; and
 wherein said plunger pin penetrates said valve body plunger end wall.

8. The spool valve recited in claim 7, further comprising a valve body spring end wall for retaining said spring.

9. The spool valve recited in claim 8, further comprising a solenoid operator coupled to said plunger pin for controlling said plunger pin penetration into said valve body.

10. The spool valve recited in claim 9, wherein said plunger pin is coupled to an armature of said solenoid operator and said valve body plunger end wall includes a stator of said solenoid operator.

11. The spool valve recited in claim 10, wherein said plunger pin penetrates a central pole piece of said solenoid operator stator.

12. The spool valve recited in claim 11, wherein said solenoid coil for said solenoid operator is wound around said stator central pole piece.

13. The spool valve recited in claim 12, wherein a magnetic field produced by said solenoid coil controls said plunger pin penetration into said valve body.

14. The spool valve recited in claim 13, wherein said armature is disc shaped, said plunger pin is coupled to the radial axis of said armature, and said solenoid magnetic field circulates through the circumferential area of said armature from said stator.

15. The spool valve recited in claim 14, wherein said plunger pin slides through said stator central pole piece along the axis of said stator central pole piece.

16. The spool valve recited in claim 15, wherein said plunger pin aligns said armature within said stator.

17. A solenoid operated spool valve comprising:
 a valve spool having a spool axis including a central recess region of predetermined length and substantially constant cross section along said recess region length;
 a valve body slidably fitted over said valve spool, including a supply port, a discharge port separated from said supply port by a port separation length less than said recess region length, said supply port and said discharge port having substantially identical areas along said valve body;
 a compression type spring, axially aligned with said valve spool axis, penetrating said valve body from a spring end of said valve body, for biasing said valve spool to a normally closed position, with said valve spool recess region positioned beyond said supply port toward said discharge port to block fluid flow through said valve recess region from said supply port;
 a plunger pin, penetrating said valve body from a plunger pin end of said valve body opposite said valve body spring end, and having a plunger pin end of said valve for displacing said valve spool to an open position, with said valve spool recess region displaced midway between said supply port and said discharge port to allow flow through said valve recess region from said supply port to said discharge port without flow induced valve spool force imbalance;
 a solenoid stator, including a central pole piece with a linear bearing through it for slidably retaining said plunger pin along said valve spool axis, and an annular pole piece, axially aligned with said central pole piece, and having a diameter substantially greater than said central pole piece;
 a solenoid armature, coupled to said plunger pin through said stator central pole piece bearing, having an axis aligned with said plunger pin axis, a working gap surface substantially parallel to the surface of said central pole piece, and a circumferential non-working gap surface substantially parallel to the surface of said stator annular pole piece; and
 a solenoid coil, wound around said central pole piece, for operating said armature coupled plunger, pin with an electric signal.

18. The solenoid operated spool valve recited in claim 17 said armature is disc shaped, having a diameter substantially greater than its thickness.

19. The solenoid operated spool valve recited in claim 18, wherein said armature includes a plurality of axial holes through said armature, substantially parallel to said armature axis, sized and radially arranged around said armature axis to minimize low temperature resistance to fluidic flow through said armature, and tangentially arranged to maximize armature magnetic efficiency and response time.

20. The solenoid operated spool valve recited in claim 19, wherein said valve spool is cyclically displaced to control flow between said valve body supply port and said valve flow discharge port.

21. The solenoid operated spool valve recited in claim 20, wherein said valve spool cyclical displacement is duty cycle controlled to proportionally vary flow between said valve body supply port and said valve body discharge port.

22. The solenoid operated spool valve recited in claim 21, wherein said valve spool controls flow in a hydraulic shock absorber for a semi-active suspension system.

23. The spool valve recited in claim 1, wherein said valve spool recess region has equal area exposed to said supply port and said discharge port when said valve spool recess region is displaced midway between said supply port and said discharge port.

24. The spool valve recited in claim 7, wherein said valve spool recess region has equal areas exposed to said supply port and said discharge port when said valve spool recess region is displaced midway between said supply port and said discharge port.

* * * * *

UNITED STATES PATENT AND TRADEMARK OFFICE
CERTIFICATE OF CORRECTION

PATENT NO. : 5,106,053
DATED : April 21, 1992
INVENTOR(S) : Alan L. Miller et al.

It is certified that error appears in the above-indentified patent and that said Letters Patent is hereby corrected as shown below:

In column 4, line 55, after "valve" insert --is--.

In column 11, line 59, delete "3" and substitute --23--.

Column 14
In claim 17, line 61 after "plunger" delete ",".
Column 14
In claim 18, line 64 after "17" insert --, wherein--.
Column 16
In claim 23, line 6 delete "area" and substitute --areas--.

Signed and Sealed this

Twelfth Day of March, 1996

Attest:

BRUCE LEHMAN

Attesting Officer        Commissioner of Patents and Trademarks